United States Patent
Annamalai et al.

(10) Patent No.: US 11,719,319 B1
(45) Date of Patent: Aug. 8, 2023

(54) TORQUE CONVERTER DAMPER ASSEMBLY

(71) Applicant: Schaeffler Technologies AG & Co. KG, Herzogenaurach (DE)

(72) Inventors: Subramanian Annamalai, Strongsville, OH (US); Noah Kee, Rittman, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/983,726

(22) Filed: Nov. 9, 2022

(51) Int. Cl.
  *F16H 45/02* (2006.01)
  *F16H 41/28* (2006.01)

(52) U.S. Cl.
  CPC ............. *F16H 45/02* (2013.01); *F16H 41/28* (2013.01); *F16H 2045/0226* (2013.01)

(58) Field of Classification Search
  CPC ..... F16H 2045/0221; F16H 2045/0205; F16H 2045/0226; F16H 45/02
  See application file for complete search history.

(56) References Cited

U.S. PATENT DOCUMENTS

| | | | | |
|---|---|---|---|---|
| 2011/0247322 | A1* | 10/2011 | Lindemann | F16F 15/13484 464/99 |
| 2015/0087430 | A1* | 3/2015 | Norwich | F16F 15/12353 464/68.9 |
| 2017/0108050 | A1* | 4/2017 | Lee | F16F 15/1234 |
| 2019/0162284 | A1* | 5/2019 | Jeyabalan | F16H 45/02 |
| 2020/0292044 | A1* | 9/2020 | Tomita | F16H 45/02 |

* cited by examiner

*Primary Examiner* — Abiy Teka

(57) ABSTRACT

A damper assembly for a torque convert includes: a first cover plate; a second cover plate; a first spring; and second spring; an intermediate flange; and a hub flange. The first cover plate is arranged to receive a torque. The second cover plate is non-rotatably connected to the first cover plate. The first cover plate and the second cover plate define a spring window. The first spring and the second spring are each disposed in the spring window and circumferentially spaced from each other. The hub flange is disposed axially between the first cover plate and the second cover plate. The hub flange is directly engaged with the first and second springs and includes a first travel stop. The intermediate flange is disposed axially between the hub flange and the first cover plate. The intermediate flange is directly engaged with the first and second springs and includes a second travel stop having a tab extending axially towards the first cover plate. The tab is engageable with the first travel stop.

18 Claims, 8 Drawing Sheets

TORQUE CONVERTER DAMPER ASSEMBLY

TECHNICAL FIELD

The present disclosure relates generally to a damper assembly for a torque converter, and more specifically to a damper assembly including interlocking travel stops and a torque converter including the damper assembly.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. In some torque converter arrangements, the torque converter may include a damper assembly having springs arranged in series and configured to transmit a torque in a drive mode and a coast mode. In such arrangements, a capacity of the damper assembly may be limited in the coast mode due to component geometries required to satisfy a capacity in the drive mode and/or limited spacing within a torque converter envelope. It is desirable to have alternative designs and configurations to fit all the necessary components within the torque converter while still meeting durability and performance requirements.

SUMMARY

Embodiments of the present disclosure provides a damper assembly for a torque converter including: a first cover plate; a second cover plate; a first spring; and second spring; an intermediate flange; and a hub flange. The first cover plate is arranged to receive a torque. The second cover plate is non-rotatably connected to the first cover plate. The first cover plate and the second cover plate define a spring window. The first spring and the second spring are each disposed in the spring window and circumferentially spaced from each other. The hub flange is disposed axially between the first cover plate and the second cover plate. The hub flange is directly engaged with the first and second springs and includes a first travel stop. The intermediate flange is disposed axially between the hub flange and the first cover plate. The intermediate flange is directly engaged with the first and second springs and includes a second travel stop having a tab extending axially towards the first cover plate. The tab is engageable with the first travel stop.

In embodiments, the intermediate flange may be configured to rotate relative to the hub flange for transmission of a drive torque. In embodiments, the tab may be configured to prevent relative rotation between the intermediate flange and the hub flange for transmission of a coast torque.

In embodiments, the second travel stop may include an extension axially offset relative to the first travel stop. The tab may be circumferentially spaced from the extension. In embodiments, the tab may axially overlap the first travel stop. In embodiments, the tab may be configured to engage one circumferential side of the first travel stop. In embodiments, the second travel stop may be configured to prevent relative rotation between the intermediate flange and the first and second cover plates. In embodiments, the first travel stop may be configured to prevent relative rotation between the hub flange and the first and second cover plates.

In embodiments, the damper assembly may include a fastener non-rotatably connecting the first cover plate and the second cover plate. For transmission of a coast torque, the tab may be configured to contact the fastener. In embodiments, the tab may be disposed circumferentially between the fastener and the first travel stop.

Embodiments of the present disclosure further provide a torque converter including a front cover, an impeller, a turbine, and a damper assembly. The front cover is arranged to receive a torque. The impeller has an impeller shell non-rotatably connected to the cover. The turbine is in fluid communication with the impeller and includes a turbine shell. The damper assembly is disposed axially between the front cover and the turbine shell. The damper assembly includes: a first cover plate; a second cover plate; a first spring; and second spring; an intermediate flange; and a hub flange. The first cover plate is arranged to receive the torque from the front cover. The second cover plate is non-rotatably connected to the first cover plate. The first cover plate and the second cover plate define a spring window. The first spring and the second spring are each disposed in the spring window and circumferentially spaced from each other. The hub flange is disposed axially between the first cover plate and the second cover plate. The hub flange is directly engaged with the first and second springs and includes a first travel stop. The intermediate flange is disposed axially between the hub flange and the first cover plate. The intermediate flange is directly engaged with the first and second springs and includes a second travel stop having a tab extending axially towards the first cover plate. The tab is engageable with the first travel stop.

In embodiments, the first travel stop and the second travel stop may be configured to permit the intermediate flange to rotate relative to the hub flange for transmission of a drive torque. In embodiments, the tab and the first travel stop may be configured to non-rotatably connect the intermediate flange to the hub flange for transmission of a coast torque. In embodiments, the tab may axially overlap the first travel stop. In embodiments, the damper assembly may include a fastener non-rotatably connecting the first cover plate and the second cover plate. For transmission of a coast torque, the tab may be configured to contact the fastener. In embodiments, the tab may be disposed circumferentially between the fastener and the first travel stop.

Embodiments of the present disclosure further provide a method for operating a damper assembly. The damper assembly includes a first cover plate, a second cover plate non-rotatably connected to the first cover plate, first and second springs each disposed in a spring window defined by the first and second cover plates, a hub flange disposed axially between the first and second cover plates and directly engaged with the first and second springs, an intermediate flange disposed axially between the hub flange and the first cover plate and directly engaged with the first and second springs, a first travel stop on the hub, and a second travel stop on the intermediate flange having a tab extending axially towards the first cover plate and being engageable with the first travel stop. The method includes providing a coast torque to the first cover plate. The method further includes compressing the first spring against the intermediate flange via the first cover plate. The method further includes rotating the intermediate flange via transmission of the coast torque through the first spring. The method further includes rotating, via an interface between the tab and the first travel stop, the hub flange relative to the first and second cover plates.

In embodiments, the intermediate flange may rotate with the hub flange.

In embodiments, the method may further include providing a drive torque to the first cover plate. The method may further include compressing the second spring against the intermediate flange via the first cover plate. The method may further include rotating the intermediate flange relative to the first and second cover plates via transmission of the drive torque through the second spring. The method may further include compressing the first spring against the hub flange via the intermediate flange. The method may further include rotating the hub flange relative to the first and second cover plates via transmission of the drive torque through the first spring.

In embodiments, the intermediate flange may rotate relative to the hub flange. In embodiments, the method may further include contacting, with the tab, a fastener arranged to non-rotatably connect the first and second cover plate. The method may further include preventing, with the tab, further rotation of the intermediate flange relative to the first and second cover plates.

Embodiments of the present disclosure provide the advantageous benefit of increasing a capacity, for transmission of a coast torque, of a damper assembly having a spring arranged in series with a further spring having a higher spring rate than the spring, for example, by interlocking travel stops on an intermediate flange and a hub flange to limit or prevent compression of the spring for transmission of the coast torque. Further, embodiments disclosed herein offer design advantages by selectively compressing the spring and the further spring for a drive mode or the coast mode, which can reduce costs and complexity of the damper assembly while satisfying durability, performance, and packaging requirements for torque converters with limited space.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
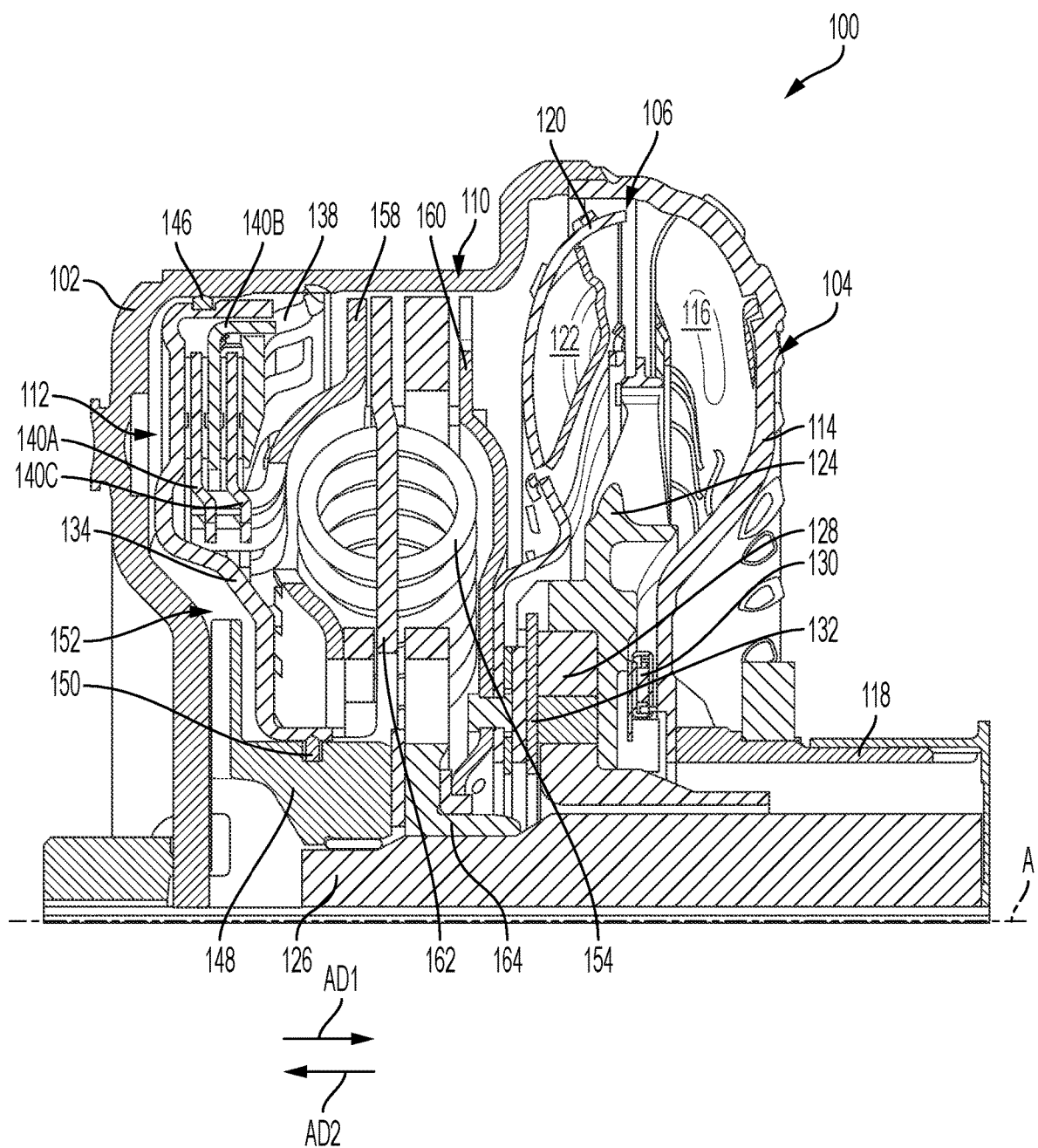
FIG. 1 illustrates a cross-sectional view of a torque converter according to the present disclosure.

Referring to FIG. 1, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; a damper assembly 110; and a lock-up clutch assembly 112. The impeller assembly 104 includes: an impeller shell 114 non-rotatably connected to the front cover 102; at least one impeller blade 116 attached to an inner surface of the impeller shell 114; and an impeller hub 118 fixed to a radially inner end of the impeller shell 114. The turbine assembly 106 includes: a turbine shell 120; and at least one turbine blade 122 attached to the turbine shell 120. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The torque converter 100 may include a stator 124 disposed axially between the impeller assembly 104 and the turbine assembly 106 to redirect fluid flowing from the turbine blade 122 before the fluid reaches the impeller assembly 104 to increase an efficiency of the torque converter 100. For example, the impeller blade 116, when rotated about the central axis A, pushes the fluid outwardly. The fluid pushes against the turbine assembly 106 of the torque converter 100, causing the turbine assembly 106 to revolve about the central axis A. The stator 124 functions to return the fluid from the turbine assembly 106 back to the impeller assembly 104 with minimal or no power loss. Drive power is transmitted from the turbine assembly 106 to a transmission input shaft 126. The torque converter 100 may, for example, further include: a one-way clutch 128 disposed within the stator 124, a thrust bearing 130 disposed axially between the stator 124 and the impeller shell 114, and a side plate 132 configured to retain the one-way clutch 128 within the stator 124.

The lock-up clutch assembly 112 is configured to selectively transfer torque from the front cover 102 to the transmission input shaft 126. The lock-up clutch assembly 112 includes a piston 134, a clutch plate 140, and a reaction plate 138. The reaction plate 138 may be fixed to the front cover 102 via a weld, for example.

The clutch plate 140 is disposed between the reaction plate 138 and the piston 134 and connected to the damper assembly 110, e.g., via a tabbed connection. The lock-up clutch assembly 112 may include one or more clutch plates 140. In the embodiment shown in FIG. 1, the lock-up clutch assembly 112 includes a clutch plate 140A, a clutch plate 140B, and a clutch plate 140C with the clutch plates 140A, 140C being connected to the damper assembly 110, e.g., via a tabbed connection, and the clutch plate 140B being connected to the reaction plate 138, e.g., via a tabbed connection. In the discussion above and in the discussion that follows, capital letters are used to designate a specific component from a group of components otherwise designated by a three-digit number, for example, clutch plate 140A is a specific example from among clutch plates 140.

The piston 134 is axially slidable to compress the clutch plate(s) 140 against the reaction plate 138. The piston 134 may be disposed axially between the front cover 102 and the clutch plate(s) 140 and configured to be sealed to the front cover 102 at an outer end thereof via a seal 146 and sealed to a hub 148 at an inner end thereof via a seal 150. The piston 134 may further be connected to the front cover 102 via a leaf-spring connection that allows axial displacement of the piston 134 in a first axial direction AD1 and a second axial direction AD2 for selective engagement of the lock-up clutch assembly 112.

During axial movement of the piston 134, the piston 134 slides along the hub 148. The piston 134 closes the lock-up clutch assembly 112 in response to pressurization of a medium (e.g., fluid such as oil) in a piston apply chamber 152 defined between the front cover 102 and the piston 134. Seals 146, 150 maintain a fluid separation between the piston apply chamber 152 and the rest of the torque converter 100. The piston apply chamber 152 is further defined by, or bounded between, the front cover 102, the hub 148, the seal 146, the piston 134, and the seal 150. By "bounded in part," we mean that a portion of the cited chamber, flow path, or other structure is bounded, or formed, by the cited element.

The damper assembly 110 is positioned axially between the front cover 102 and the turbine assembly 106 and is configured to transfer torque from the front cover 102 to the transmission input shaft 126. The damper assembly 110 includes: a first spring 154; a second spring 156, cover plates 158, 160; an intermediate flange 162, and a hub flange 164. The first spring 154 has a different spring rate than the second spring 156. For example, the spring rate of the first spring 154 may be greater than the spring rate of the second spring 156.

The cover plate 158 may support the springs 154, 156 on one axial side. The cover plate 160 may support the springs 154, 156 on another, opposite axial side. The cover plates 158, 160 may be connected to each other, for example, via a plurality of rivets 166, radially outward of the springs 154, 156. The cover plate 158 may be connected to the clutch plates 140A, 140C, e.g., via a tabbed connection, and the cover plate 160 may be connected to the turbine shell 120, e.g., via a riveted connection. That is, the cover plates 158, 160 are arranged to act as an input to the damper assembly 110.

Figure 2A:
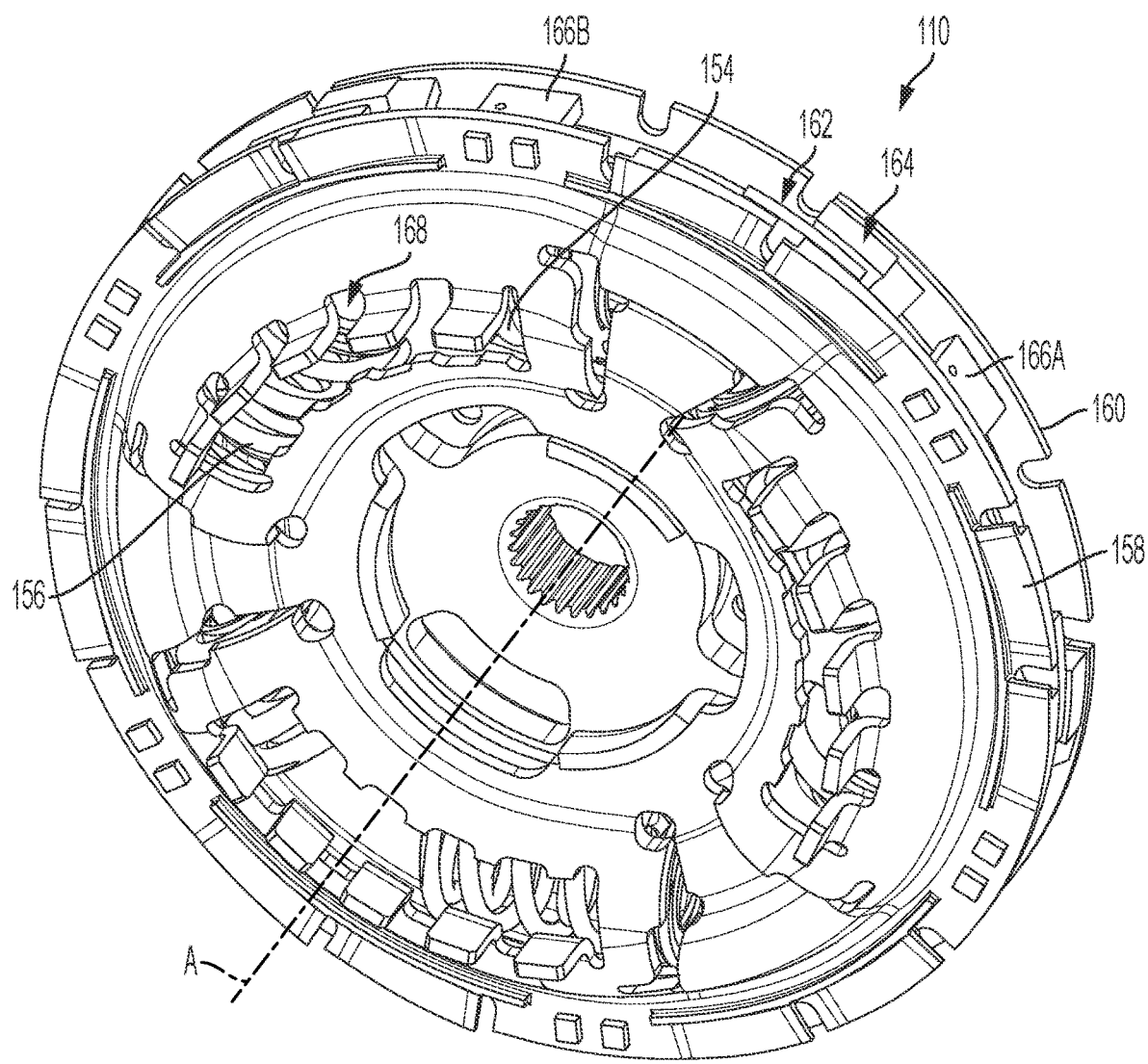
FIG. 2A illustrates a perspective view of a damper assembly according to the present disclosure.

Referring to FIG. 2A, the cover plates 158, 160 may define a spring window 168 extending partially circumferentially about the central axis A. The spring window 168 may be configured to receive the first spring 154 and the second spring 156. The first and second springs 154, 156 may be circumferentially spaced from each other in the spring window 168.

The intermediate flange 162 is disposed axially between the cover plates 158, 160, and, specifically, between the hub flange 164 and the cover plate 158. The hub flange 164 is disposed axially between the intermediate flange 162 and the cover plate 160. The hub flange 164 is connected to the transmission input shaft 126 for torque transmission therebetween.

Figure 2B:
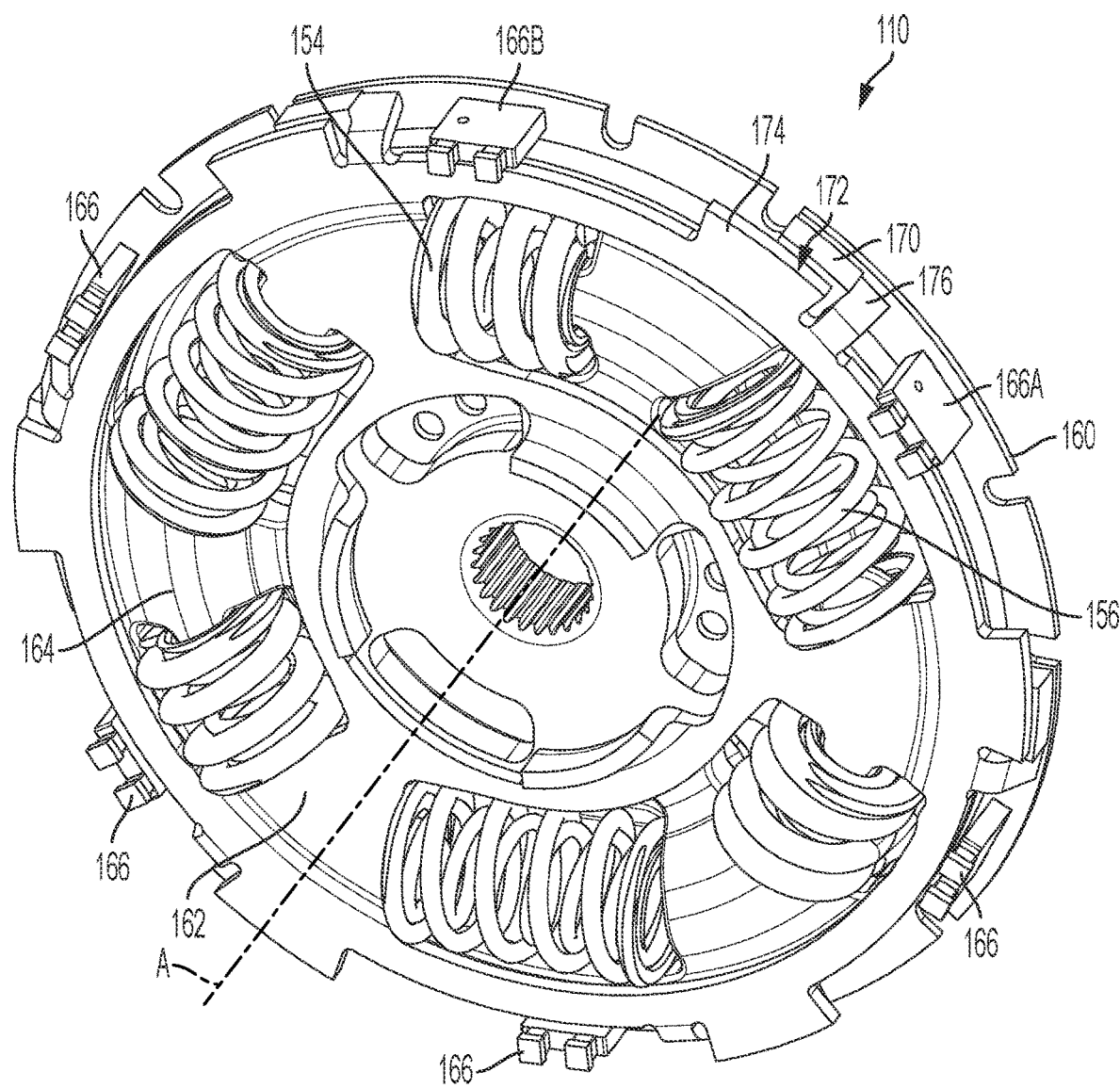
FIG. 2B illustrates a perspective view of the damper assembly shown in FIG. 2A with a cover plate omitted.

Referring to FIG. 2B, the hub flange 164 and the intermediate flange 162 are each engaged with the first and second springs 154, 156 to transmit torque through the damper assembly 110, as discussed further below. The intermediate flange 162 and the hub flange 164 may each define a plurality of slots (not numbered) circumferentially spaced from each other. The slots in the intermediate flange 162 may be circumferentially offset relative to the slots in the hub flange 164 such that one slot of the intermediate flange 162 defines a first opening (not numbered) with one slot of the hub flange 164 and a second opening (not numbered) with another slot of the hub flange 164. The first opening may be configured to receive the first spring 154, and the second opening may be configured to receive the second spring 156. The intermediate flange 162 and the hub flange 164 may be configured to rotate relative to each other to transmit torque through the damper assembly 110 such that the first spring 154 and/or the second spring 156 are compressed in the respective opening.

Figure 3A:
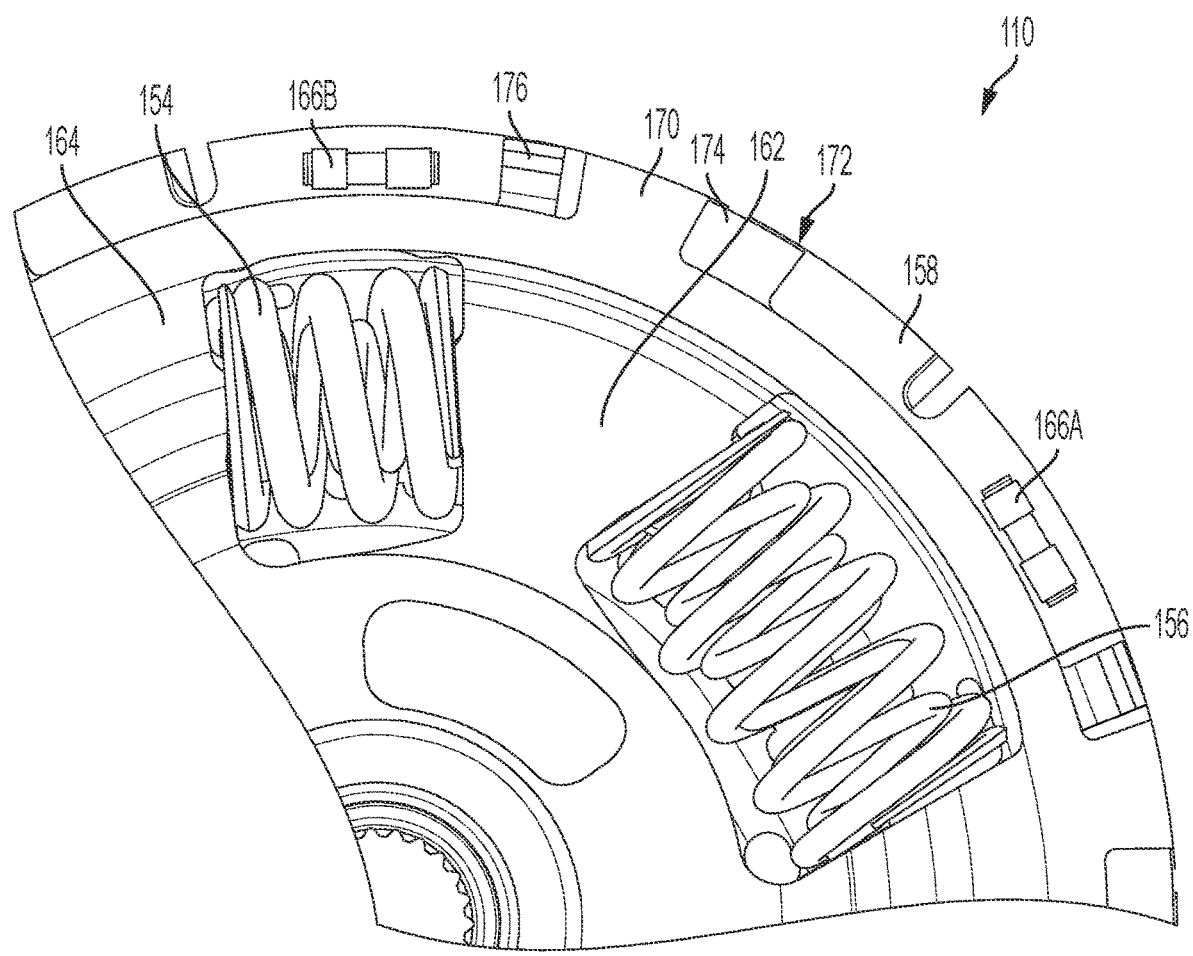
FIG. 3A illustrates a side view of an area of the damper assembly when the damper assembly is not subjected to a torque.
Figure 3B:
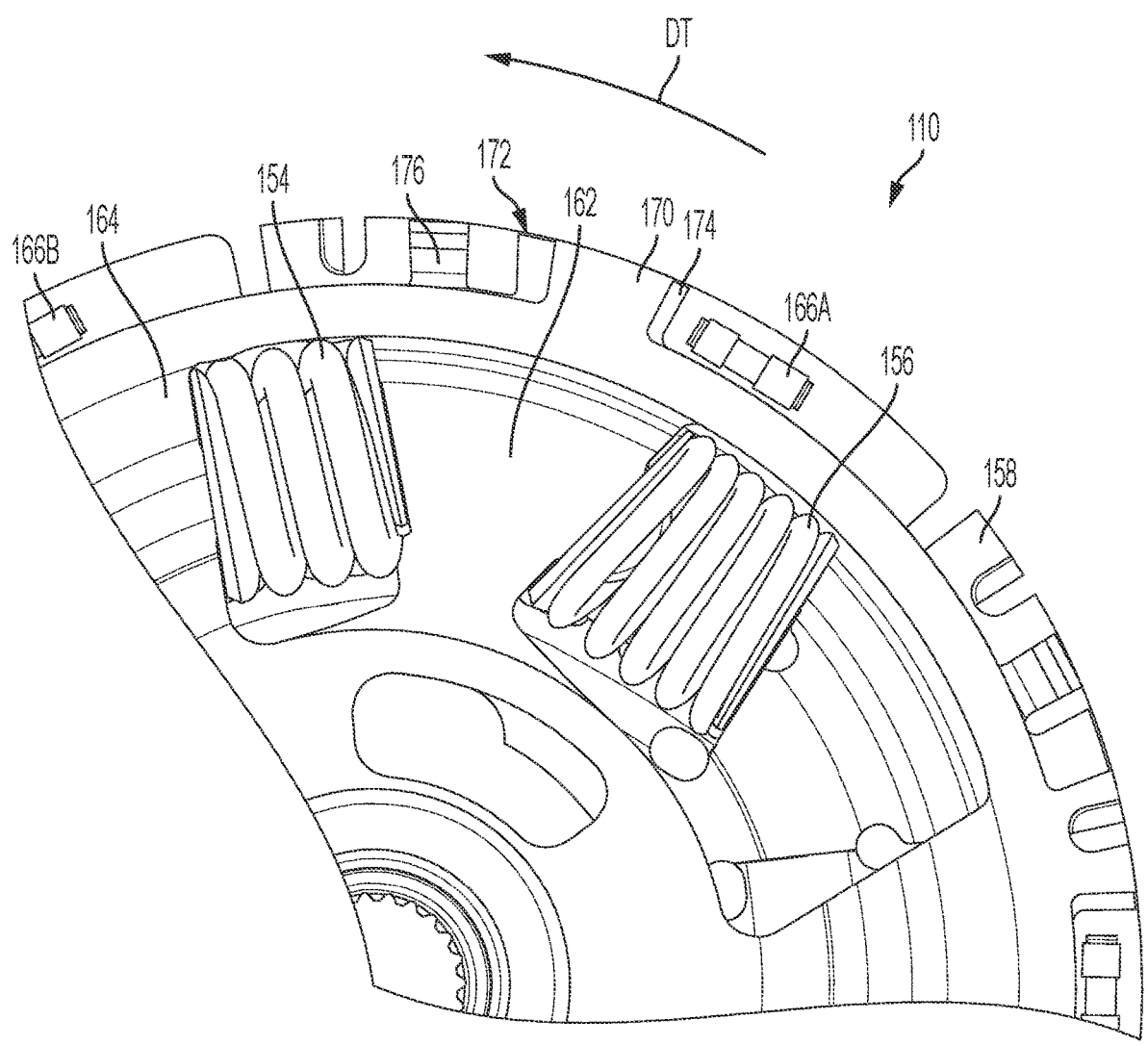
FIGS. 3B-3C illustrate a side view of the area of the damper assembly when the damper assembly is subjected to a drive torque.
Figure 3C:
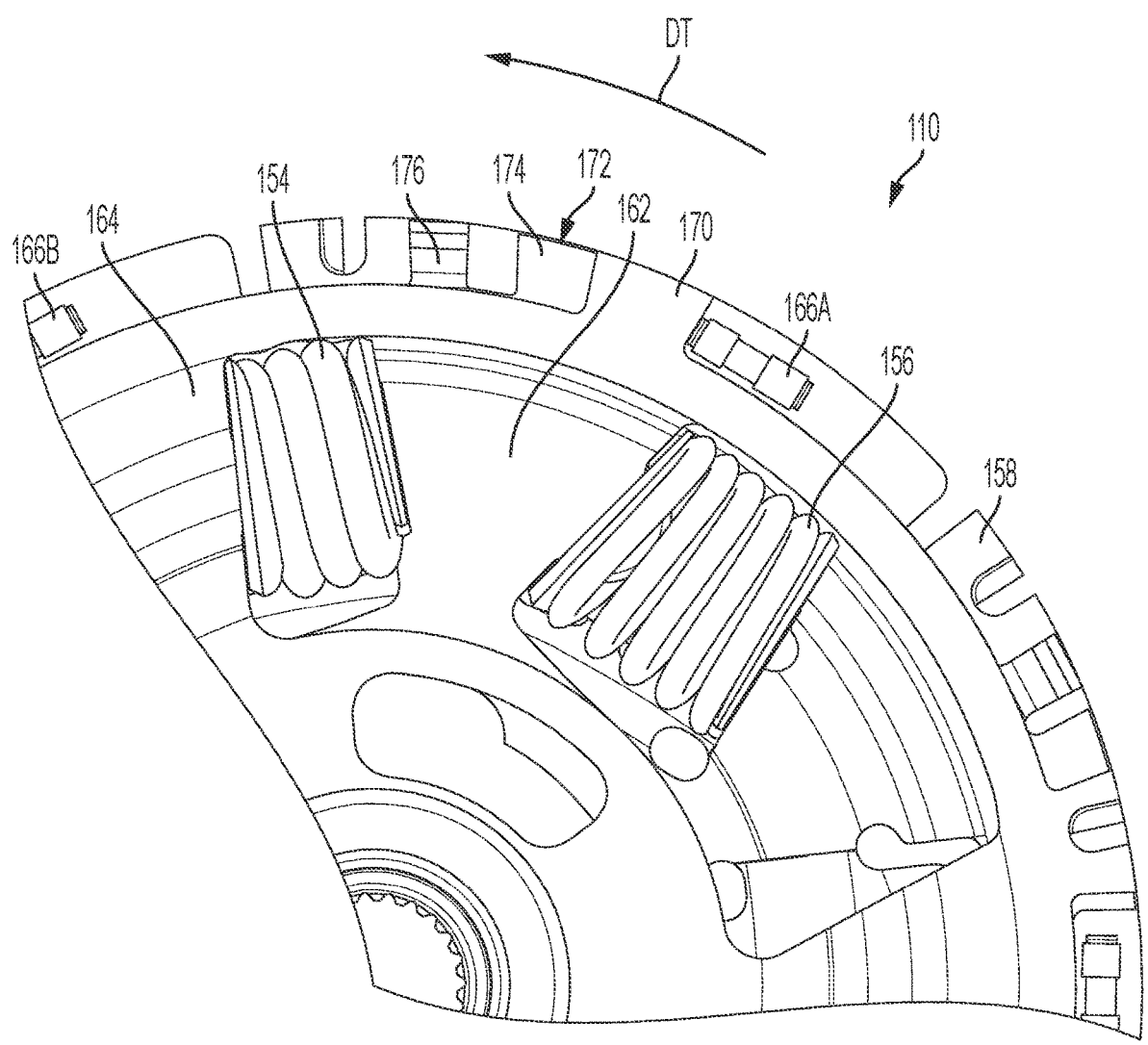

The hub flange 164 includes a first travel stop 170 arranged on an outer diameter of the hub flange 164. The first travel stop 170 extends radially outward from the outer diameter of the hub flange 164 and circumferentially along the outer diameter of the hub flange 164. The first travel stop 170 is configured to engage a rivet 166A. The first travel stop 170 may be arranged such that the first travel stop 170 contacts the rivet 166A when the first spring 154 has been compressed to its solid length (as shown in FIG. 3C). Upon engaging the rivet 166A, the first travel stop 170 prevents rotation of the hub flange 164 relative to the cover plates 158, 160. That is, an interface between the first travel stop 170 and the rivet 166A non-rotatably connects the hub flange 164 to the cover plates 158, 160.

The intermediate flange 162 includes a second travel stop 172 arranged on an outer diameter of the intermediate flange 162. The second travel stop 172 includes an extension 174 and a tab 176. The extension 174 extends radially outward from the outer diameter of the intermediate flange 162 and circumferentially along the outer diameter of the intermediate flange 162. The extension 174 is disposed circumferentially between the tab 176 and the rivet 166A and is configured to engage the rivet 166A. The extension 174 may be arranged such that the extension 174 contacts the rivet 166A when the second spring 156 has been compressed to its solid length (as shown in FIG. 3C). Upon engaging the rivet 166A, the extension 174 prevents rotation of the intermediate flange 162 relative to the cover plates 158, 160. That is, an interface between the extension 174 and the rivet 166A non-rotatably connects the intermediate flange 162 to the cover plates 158, 160.

The extension 174 may be configured to engage the rivet 166A prior to the first travel stop 170 engaging the rivet 166A. For example, at least a portion of the extension 174 may be axially offset relative to the first travel stop 170, i.e., disposed circumferentially between the rivet 166A and the first travel stop 170. That is, a line extending parallel to the central axis A and passing through the extension 174 may not pass through the first travel stop 170.

Figure 3D:
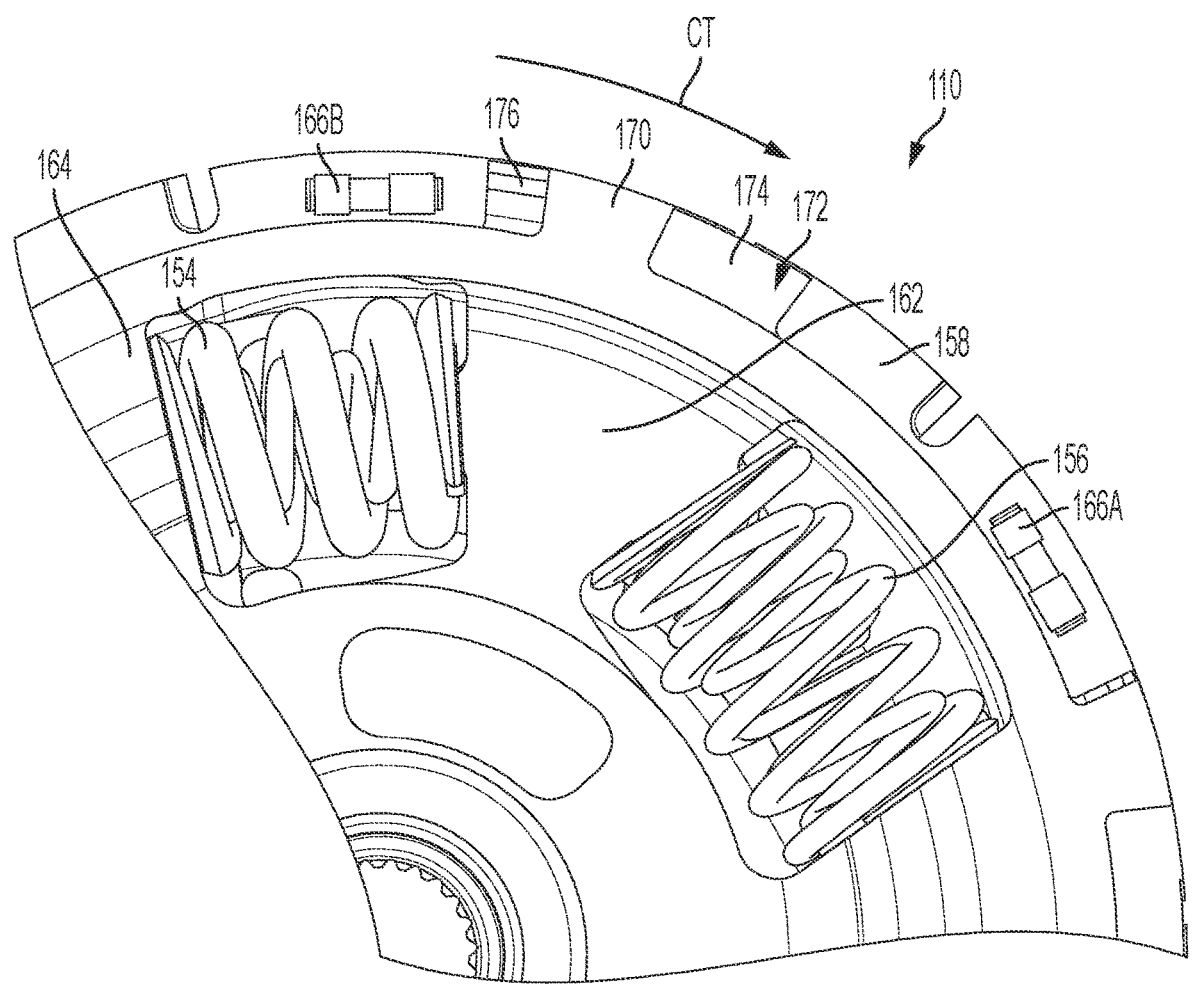
FIGS. 3D-3E illustrate a side view of the area of the damper assembly when the damper assembly is subjected to a coast torque.
Figure 3E:
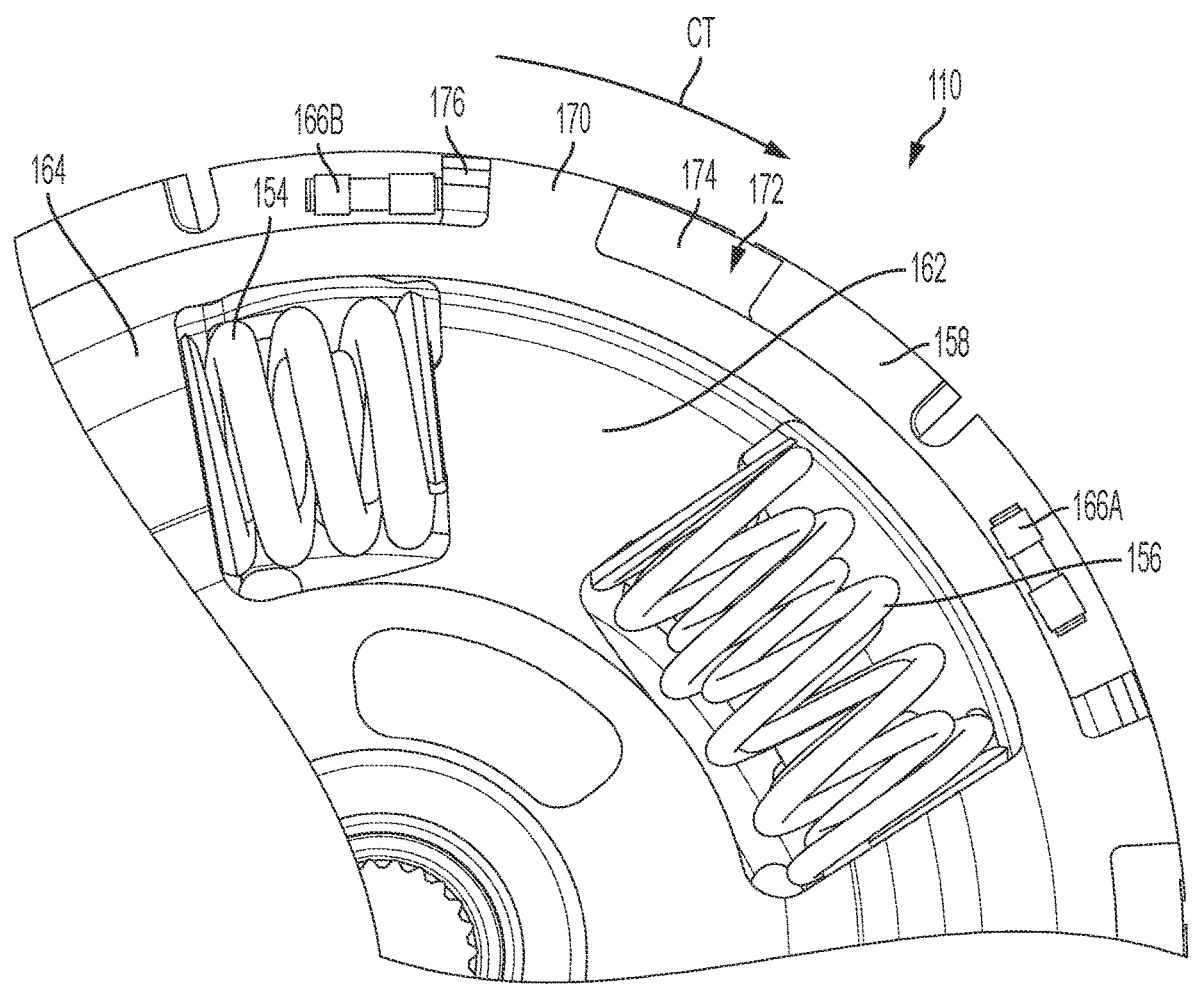

The tab 176 may, for example, be circumferentially spaced from the extension 174. Alternatively, the tab 176 may be arranged on a circumferential side of the extension 174. The tab 176 is disposed circumferentially between the first travel stop 170 and a rivet 166B that is circumferentially spaced from the rivet 166A. The tab 176 is configured to engage the rivet 166B (as shown in FIG. 3E). Upon engaging the rivet 166B, the tab 176 prevents rotation of the intermediate flange 162 relative to the cover plates 158, 160. That is, an interface between the tab 176 and the rivet 166B non-rotatably connects the intermediate flange 162 to the cover plates 158, 160.

The tab 176 is configured to selectively engage the first travel stop 170. That is, the tab 176 is configured to engage, i.e., contact, the first travel stop 170 during transmission of a coast torque CT and is configured to not engage, i.e., contact, the first travel stop 170 during transmission of a drive torque DT. The tab 176 extends axially from the intermediate flange 162 towards the cover plate 158 (as shown in FIG. 2B). Specifically, the tab 176 axially overlaps the first travel stop 170. That is, the tab 176 may intersect an arc defined by a rotational path of the first travel stop 170 about the central axis A.

During transmission of the coast torque CT, the tab 176 and the first travel stop 170 are configured to prevent relative rotation between the intermediate flange 162 and the hub flange 164. The tab 176 rotates about the central axis A towards the first travel stop 170 during transmission of the coast torque CT. Specifically, the tab 176 contacts the first travel stop 170 to drive the hub flange 164 during transmission of the coast torque CT (as shown in FIG. 3D). During transmission of the drive torque DT, the first and second travel stops 170, 172 are configured to permit relative rotation between the intermediate flange 162 and the hub flange 164. That is, the firs travel stop 170 rotates about the central axis A away from the tab 176 during transmission of the drive torque DT.

For transmission of the drive torque DT, the intermediate flange 162 and the hub flange 164 are configured to compress the first and second springs 154, 156. The tab 176 may be arranged to permit or prevent compression of the second spring 156 during transmission of the coast torque CT. For example, the tab 176 may be circumferentially spaced from the first travel stop 170 when the damper assembly 110 is not subjected to a torque (as shown in FIG. 3A). In such an example, the tab 176 may permit compression of the second spring 156 during transmission of a coast torque CT (as shown in FIG. 3D). As another example, the tab 176 may contact the first travel stop 170 when the damper assembly 110 is not subjected to a torque (as shown in FIGS. 2A-2B). In such an example, the tab 176 may prevent compression of the second spring 156 during transmission of the coast torque CT.

The following should be viewed in light of FIGS. 1-3E. The following describes an exemplary method of operating the damper assembly 110 in a drive mode, i.e., to transmit a drive torque DT. However, it is to be understood that the method may include fewer steps and/or the steps may be executed in a different order. A first step provides a drive torque DT to the cover plate 158. A second step compresses the second spring 156 between the cover plate 158 and the intermediate flange 162. A third step transmits, via the second spring 156, the drive torque DT from the cover plate 158 to the intermediate flange 162. A fourth step rotates the intermediate flange 162 towards the rivet 166A. In this situation, the intermediate flange 162 can rotate relative to the hub flange 164, e.g., due to the different spring rates of the first and second springs 154, 156. A fifth step compresses the first spring 154 between the intermediate flange 162 and the hub flange 164. A sixth step transmits, via the first spring 154, the drive torque DT from the intermediate flange 162 to the hub flange 164. A seventh step rotates the hub flange 164 towards the rivet 166A. An eighth step contacts, with the second travel stop 172, and specifically the extension 174, the rivet 166A to prevent further compression of the second spring 156. In this situation, the intermediate flange 162 rotates together with the cover plates 158, 160 and relative to the hub flange 164. A ninth step contacts, with the first travel stop 170, the rivet 166A to prevent further compression of the first spring 154 (as shown in FIG. 3C). In this situation, the hub flange 164, the intermediate flange 162, and the cover plates 158, 160 rotate together for transmission of the drive torque DT.

The following should be viewed in light of FIGS. 1-3E. The following describes an exemplary method of operating the damper assembly 110 in a coast mode, i.e., to transmit a coast torque CT. However, it is to be understood that the method may include fewer steps and/or the steps may be executed in a different order. A first step provides the coast torque CT to the cover plate 158. A second step compresses the first spring 154 between the intermediate flange 162 and the cover plate 158. A third step transmits, via the first spring 154, the coast torque CT from the cover plate 158 to the intermediate flange 162. A fourth step compresses the second spring 156 between the intermediate flange 162 and the hub flange 164. A fifth step rotates the intermediate flange 162 relative to the hub flange 164 until the tab 176 contacts the first travel stop 170 (as shown in FIG. 3D). The fourth and fifth steps 508, 510 can be omitted in examples where the tab 176 contacts the first travel stop 170 when the damper assembly 110 is not subjected to a torque.

A sixth step rotates, via an interface between the first travel stop 170 and the tab 176, the hub flange 164 and the intermediate flange 162 together relative to the cover plates 158, 160. By driving the hub flange 164 via the tab 176, compression of the second spring 156 can be limited or prevented during transmission of the coast torque CT, which can increase a capacity for the damper assembly 110 to transmit coast torque CT within a rotational envelop for the damper assembly 110. A seventh step contacts, with the tab 176, the rivet 166B to prevent further compression of the first spring 154 (as shown in FIG. 3E). In this situation, the hub flange 164, the intermediate flange 162, and the cover plates 158, 160 rotate together for transmission of the coast torque CT.

Embodiments according to the present disclosure provide various advantages including limiting or preventing compression of one spring in an in-line series damper for transmission of a coast torque, which can increase a capacity of a damper assembly to transmit the coast torque while reducing complexity of the damper assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller assembly
106 turbine assembly
110 damper assembly
112 lock-up clutch assembly
114 impeller shell
116 impeller blade
118 impeller hub
120 turbine shell
122 turbine blade
124 stator
126 transmission input shaft
128 one-way clutch
130 thrust bearing
132 side plate
134 piston
138 reaction plate
140 clutch plate
146 seal
148 hub
150 seal
152 apply chamber
154 spring
156 spring
158 cover plate
160 cover plate
162 intermediate flange
164 hub flange
166 rivet
168 spring window
170 first travel stop
172 second travel stop
174 extension
176 tab
A central axis
AD1 axial direction
AD2 axial direction
CT coast torque
DT drive torque

What is claimed is:

1. A damper assembly for a torque converter, comprising:
a first cover plate arranged to receive a torque;
a second cover plate non-rotatably connected to the first cover plate, the first cover plate and the second cover plate defining a spring window;
a first spring and a second spring each disposed in the spring window and circumferentially spaced from each other;
a hub flange disposed axially between the first cover plate and the second cover plate, the hub flange being directly engaged with the first and second springs and including a first travel stop; and
an intermediate flange disposed axially between the hub flange and the first cover plate, the intermediate flange being directly engaged with the first and second springs and including a second travel stop having a tab extending axially towards the first cover plate;
wherein the tab is engageable with the first travel stop and is configured to prevent relative rotation between the intermediate flange and the hub flange for transmission of a coast torque.

2. The damper assembly of claim 1, wherein the intermediate flange is configured to rotate relative to the hub flange for transmission of a drive torque.

3. The damper assembly of claim 1, wherein the second travel stop includes an extension axially offset relative to the first travel stop, the tab being circumferentially spaced from the extension.

4. The damper assembly of claim 1, wherein the tab axially overlaps the first travel stop.

5. The damper assembly of claim 1, wherein the second travel stop is configured to prevent relative rotation between the intermediate flange and the first and second cover plates.

6. The damper assembly of claim 1, wherein the first travel stop is configured to prevent relative rotation between the hub flange and the first and second cover plates.

7. The damper assembly of claim 1, further comprising a fastener non-rotatably connecting the first cover plate and the second cover plate, wherein, for transmission of a coast torque, the tab is configured to contact the fastener.

8. The damper assembly of claim 7, wherein the tab is disposed circumferentially between the fastener and the first travel stop.

9. A torque converter, comprising:
a front cover arranged to receive a torque;
an impeller having an impeller shell non-rotatably connected to the cover;
a turbine in fluid communication with the impeller and including a turbine shell;
a damper assembly disposed axially between the front cover and the turbine shell, the damper assembly including:
a first cover plate arranged to receive the torque from the front cover;
a second cover plate non-rotatably connected to the first cover plate, the first cover plate and the second cover plate defining a spring window;
a first spring and a second spring each disposed in the spring window and circumferentially spaced from each other;
a hub flange disposed axially between the first cover plate and the second cover plate, the hub flange being directly engaged with the first and second springs and including a first travel stop; and
an intermediate flange disposed axially between the hub flange and the first cover plate, the intermediate flange being directly engaged with the first and second springs and including a second travel stop having a tab extending axially towards the first cover plate;

wherein the tab axially overlaps the first travel stop and is engageable with the first travel stop.

10. The torque converter of claim 9, wherein the first travel stop and the second travel stop are configured to permit the intermediate flange to rotate relative to the hub flange for transmission of a drive torque.

11. The torque converter of claim 9, wherein the tab and the first travel stop are configured to non-rotatably connect the intermediate flange to the hub flange for transmission of a coast torque.

12. The torque converter of claim 9, wherein the damper assembly includes a fastener non-rotatably connecting the first cover plate and the second cover plate, wherein, for transmission of a coast torque, the tab is configured to contact the fastener.

13. The torque converter of claim 12, wherein the tab is disposed circumferentially between the fastener and the first travel stop.

14. A method for operating a damper assembly, the damper assembly including a first cover plate, a second cover plate non-rotatably connected to the first cover plate, first and second springs each disposed in a spring window defined by the first and second cover plates, a hub flange disposed axially between the first and second cover plates and directly engaged with the first and second springs, an intermediate flange disposed axially between the hub flange and the first cover plate and directly engaged with the first and second springs, a first travel stop on the hub, and a second travel stop on the intermediate flange having a tab extending axially towards the first cover plate and being engageable with the first travel stop, the method comprising:

providing a coast torque to the first cover plate;

compressing the first spring against the intermediate flange via the first cover plate;

rotating the intermediate flange via transmission of the coast torque through the first spring; and rotating, via an interface between the tab and the first travel stop, the hub flange relative to the first and second cover plates.

15. The method of claim 14, wherein the intermediate flange rotates with the hub flange.

16. The method of claim 14, further comprising:

providing a drive torque to the first cover plate;

compressing the second spring against the intermediate flange via the first cover plate;

rotating the intermediate flange relative to the first and second cover plates via transmission of the drive torque through the second spring;

compressing the first spring against the hub flange via the intermediate flange; and rotating the hub flange relative to the first and second cover plates via transmission of the drive torque through the first spring.

17. The method of claim 16, wherein the intermediate flange rotates relative to the hub flange.

18. The method of claim 14, further comprising:

contacting, with the tab, a fastener arranged to non-rotatably connect the first and second cover plate; and preventing, with the tab, further rotation of the intermediate flange relative to the first and second cover plates.

* * * * *